US 11,480,086 B2

(12) United States Patent
Richard et al.

(10) Patent No.: US 11,480,086 B2
(45) Date of Patent: Oct. 25, 2022

(54) HEATING DEVICE, PURIFICATION DEVICE, EXHAUST LINE, MANUFACTURING METHOD OF THE HEATING DEVICE

(71) Applicant: FAURECIA SYSTEMES D'ECHAPPEMENT, Nanterre (FR)

(72) Inventors: Gaëtan Richard, Belfort (FR); Ting Feng, Vieux-Charmont (FR); Thomas Ferrier, Montbeliard (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 17/355,273

(22) Filed: Jun. 23, 2021

(65) Prior Publication Data
US 2021/0404363 A1    Dec. 30, 2021

(30) Foreign Application Priority Data

Jun. 30, 2020   (FR) ..................... 20 06874

(51) Int. Cl.
  *F01N 3/20*   (2006.01)
(52) U.S. Cl.
  CPC ........ *F01N 3/2026* (2013.01); *F01N 2240/16* (2013.01); *F01N 2240/20* (2013.01); *F01N 2330/02* (2013.01)
(58) Field of Classification Search
  CPC .. H05B 3/12; H05B 3/10; H05B 3/141; F01N 3/2026; F01N 2260/10
  See application file for complete search history.

(56) References Cited

U.S. PATENT DOCUMENTS 5,063,029 A * 11/1991 Mizuno ................. F01N 3/2803
                                                           422/175
5,194,229 A *  3/1993 Abe .................... F01N 3/2026
                                                           422/174
5,202,547 A *  4/1993 Abe .................... F01N 3/2803
                                                           219/552
5,399,841 A *  3/1995 Abe .................... F01N 3/2026
                                                           219/552

(Continued)

FOREIGN PATENT DOCUMENTS

EP     0502727 A1    9/1992
EP     0661097 A1    7/1995

(Continued)

OTHER PUBLICATIONS

French Preliminary Search Report for French Patent Application No. 20 06874 dated Nov. 4, 2020.

*Primary Examiner* — Anthony Ayala Delgado
(74) *Attorney, Agent, or Firm* — Carlson, Gaskey & Olds, P.C.

(57) ABSTRACT

A heating device comprises a heating element having a central area and a peripheral edge. The heating element has a series of slots delimiting a series of longitudinal branches connected to one another by elbows. The central area is made of a first electrically conductive material that is permeable to exhaust gases and has a first relative density. The elbows are located in the peripheral edge and are made of a second electrically conductive material and that has a second relative density greater than the first relative density.

17 Claims, 12 Drawing Sheets

(56) References Cited

U.S. PATENT DOCUMENTS

| | | | | |
|---|---|---|---|---|
| 5,446,264 A * | 8/1995 | Kondo | ............... | H05B 3/12 |
| | | | | 219/552 |
| 5,651,088 A * | 7/1997 | Abe | ............... | F01N 3/2817 |
| | | | | 392/494 |
| 5,655,211 A * | 8/1997 | Maus | ............... | B01J 35/04 |
| | | | | 428/548 |
| 5,852,285 A * | 12/1998 | Kato | ............... | B01J 35/0033 |
| | | | | 219/553 |
| 5,861,611 A * | 1/1999 | Kato | ............... | F01N 3/2817 |
| | | | | 219/552 |
| 9,593,615 B2 * | 3/2017 | Hodgson | ............... | F01N 9/00 |
| 2010/0108657 A1 * | 5/2010 | Konieczny | ............... | B01D 46/525 |
| | | | | 219/202 |
| 2016/0205726 A1 * | 7/2016 | Spielmann | ............... | H05B 3/12 |
| | | | | 219/543 |

FOREIGN PATENT DOCUMENTS

| | | | |
|---|---|---|---|
| EP | 0755171 A2 | 1/1997 | |
| EP | 0755171 A3 | 9/1997 | |

\* cited by examiner

HEATING DEVICE, PURIFICATION DEVICE, EXHAUST LINE, MANUFACTURING METHOD OF THE HEATING DEVICE

CROSS-REFERENCE TO RELATED APPLICATIONS

This application is a U.S. non-provisional application claiming the benefit of French Application No. 20 06874, filed on Jun. 30, 2020, which is incorporated herein by reference in its entirety.

TECHNICAL FIELD

The present disclosure relates generally to the heating of exhaust gas purification members.

BACKGROUND

For heating an exhaust gas purification member, it is possible to use a heating device having a plate-like element made of an electrically conductive material permeable to exhaust gas. Two electrodes are connected to the peripheral edge of the element, at points substantially opposite each other with respect to the center of the plate. Slots substantially parallel to each other are cut in the plate, so as to create a sinuous path for the electric current flowing from one electrode to the other.

In fact, due to the presence of the slots, the heating element has several substantially parallel branches, connected to each other by U-shaped cusps.

In such an electrical heating element, there are areas in which the electrical current density is particularly high. These areas are located in the area of the U-shaped cusps in particular. The material constituting the heating element is heated to a high temperature. As a result, there are significant temperature gradients within the heating element, which contributes to a reduction in the service life of the heating element.

It is possible to overcome this problem by widening the ends of the slots.

This contributes to achieving a more uniform electrical current density distribution and lower temperature gradients within the heating element.

However, this solution is not entirely satisfactory.

In this context, the disclosure aims to provide a heating device for an exhaust gas purification member with an increased service life.

SUMMARY

The disclosure relates to a heating device for an exhaust gas purification member, the heating device comprising a heating element having a central area and a peripheral edge surrounding the central area.

The heating element has a series of slots, the slots defining an S-shaped path through the heating element.

The slots define a series of longitudinal branches in the heating element, are connected to each other by elbows, and are transversely offset from each other.

The central area is made of a first electrically conductive material permeable to the exhaust gases, and which has a first relative density.

The elbows are located in the peripheral edge, the elbows being made of a second electrically conductive material and having a second relative density greater than the first relative density.

Due the elbows being made of a material having a greater relative density than the central area of the heating element, the current density at the elbows is reduced.

In fact, the current density verifies the following equation:

$$D = I/S$$

where D is the electrical current density in amps per $cm^2$, I is the electrical current in amperes, and S is the full cross-section of the material in $cm^2$.

For a material such as a foam, the full section corresponds to the part of the section made of the full material, without taking the pores into account.

In the second material, this full section is greater than the full section of the first material. Choosing a higher relative density therefore decreases the current density at the elbows and thus helps to reduce or even eliminate hot spots at the elbows.

As a result, the elbow areas raised to a high temperature are much smaller in surface area, which contributes to a longer life of the heating element. The temperature gradients within the heating element are thus reduced.

The heating device may further represent one or more of the following features, considered alone or according to all technically possible combinations:

a. first and second power supply members are connected to first and second sections of the peripheral edge made of said second material;
b. the peripheral edge is entirely made of the second material;
c. the elbows are entirely made of the second material;
d. the peripheral edge is divided into a first edge and a second edge, each slot opening at the first edge or at the second edge with a proximal end and having a closed distal end located in the peripheral edge;
e. the first material is a foam of a metallic material, having a first volume concentration of pores;
f. the second material comprises said metallic material and has a second volume concentration of pores less than the first volume concentration.

According to a second aspect, the disclosure relates to an exhaust gas purification device, comprising:

g. an outer casing;
h. an exhaust gas purification member placed in the outer casing; and
i. a heating device having the above features, the heating element being arranged in the outer casing, preferably upstream of the purification member.

According to a third aspect, the disclosure relates to an exhaust line comprising a purification device having the above features.

According to a fourth aspect, the disclosure relates to a method of manufacturing a heating device having the above features, the manufacturing method comprising the following steps:

j. obtaining an annular part made of the second material;
k. obtaining a plate made of the first material;
l. inserting the plate inside the annular part; and
m. bonding the plate and the annular part by heating at a high temperature in an oven.

BRIEF DESCRIPTION OF THE DRAWINGS

Further features and advantages of the disclosure will be apparent from the detailed description given below, by way of indication and not in any way limiting, with reference to the appended Figures, of which.

DETAILED DESCRIPTION

Figure 1:
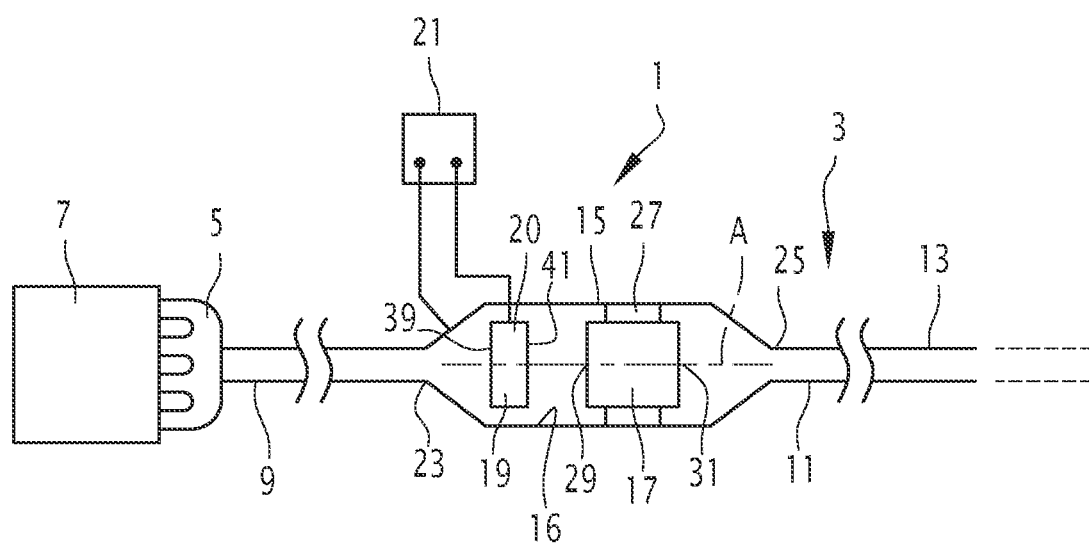
FIG. 1 is a simplified schematic representation of an exhaust line comprising a heating device according to the disclosure.

The purification device 1 shown schematically in FIG. 1 is intended for purifying the exhaust gases of a vehicle, typically a motor vehicle with an internal combustion engine such as a car or truck.

The purification device 1 is inserted in the exhaust line 3 of the vehicle. This typically comprises an exhaust manifold 5 collecting the exhaust gases leaving the combustion chambers of the vehicle's combustion engine 7. The manifold 5 is integrated into the engine head or is an element added on to the engine 7.

The purification device 1 is fluidly connected to the manifold 5 by an upstream pipe 9, on which other equipment such as a turbocharger is typically interposed.

Downstream, the purification device 1 is fluidly connected by a downstream conduit 11 to a cannula 13. Other equipment, such as silencers or other purification equipment, are interposed between the purification device 1 and the cannula 13. The purified exhaust gas is released into the atmosphere through the cannula 13.

The purification device 1 comprises an outer casing 15 having an inner surface 16 with a central axis A and an electrical heating device 19.

The heating device 19 comprises an electrical heating element 20 housed in the outer casing 15 and a power supply 21.

The outer casing 15 has an exhaust gas inlet 23 and outlet 25, connected to the upstream 9 and downstream 11 ducts respectively.

The outer casing 15 has any suitable shape.

The purification device 1 further comprises an exhaust gas purification member 17 housed in the outer casing 15.

The purification device 17 is, for example, an SCR catalyst, a three-way catalyst, an oxidation catalyst or a NOx trap.

As seen in FIG. 1, a retaining mat 27 is interposed between the purification member 17 and the outer casing 15.

Typically, one or more purification members 17 are placed in the outer casing 15.

Advantageously, the heating element 20 is placed in front of and close to the inlet face 29 of the purification member 17. In a variant, the heating element 20 is placed in front of and close to the outlet face 31 of the purification member 17, i.e., downstream thereof. The inlet 29 and outlet 31 faces are the faces through which the exhaust gases enter and exit the purification member 17.

In a variant, the heating element 20 is placed at a distance upstream of the purification member 17.

Typically, another retaining mat (not shown) is interposed between the heating element 20 and the outer casing 15. It holds the heating element in position relative to the outer jacket 15.

The shape of the heating element 20 depends on the cross-section of the outer casing 15 and the purification member 17.

For example, it is circular.

In a variant, it is oval or any other suitable shape.

According to one embodiment, the heating element 20 is substantially flat and thin.

The heating element 20 is typically a heating plate. In a variant, the heating element has any other suitable shape.

The heating element 20 typically extends in a plane substantially perpendicular to the central axis A.

Typically, the heating element 20 heats by Joule effect.

The heating element 20 has a thickness between 2 and 50 mm, preferably between 5 and 30 mm, and even more preferably between 10 and 20 mm.

Figure 2:
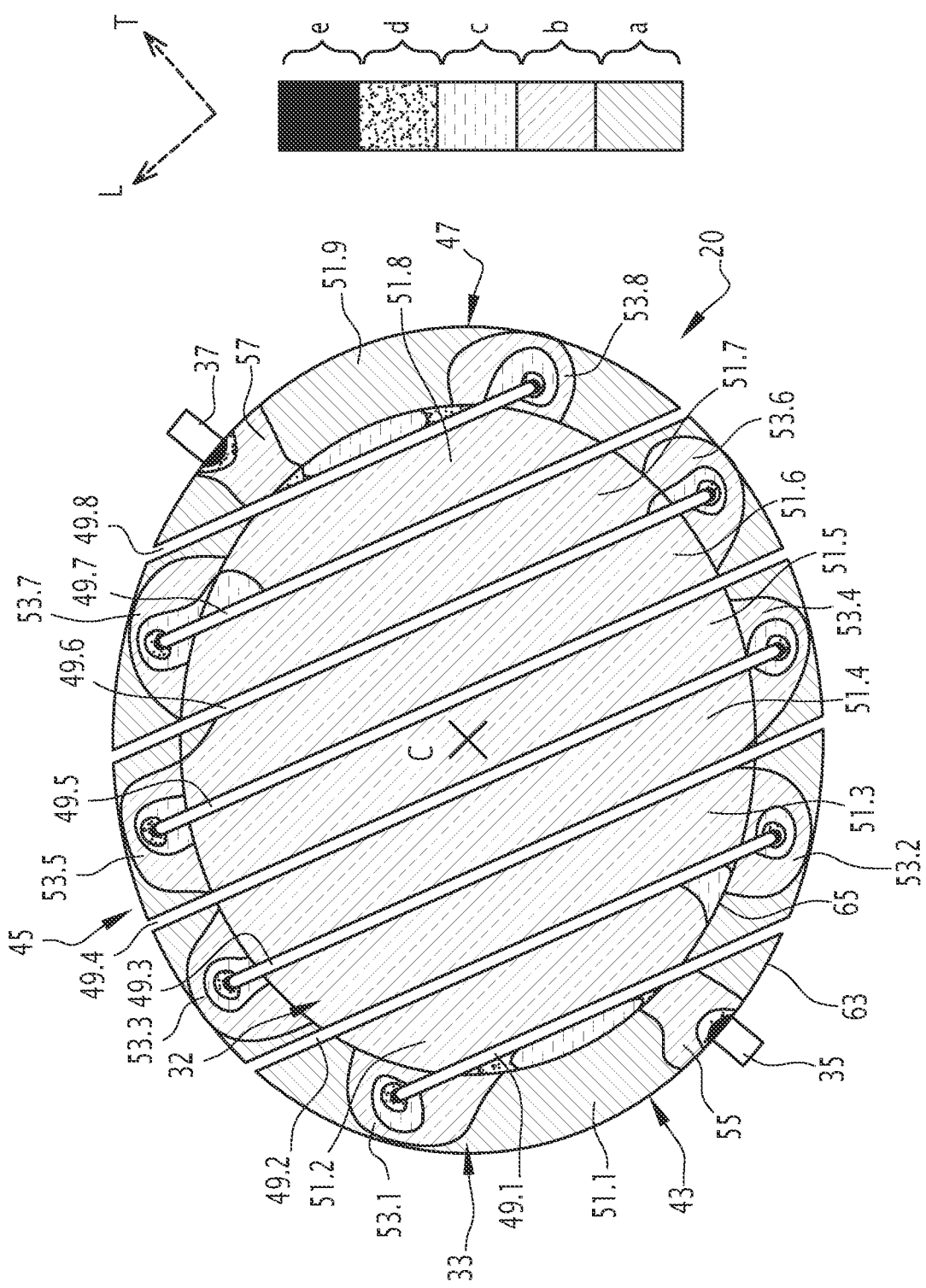
FIG. 2 is a front view of the heating element of FIG. 1, with areas representing the levels of electrical current density in the heating element superimposed on said Figure.

As seen in FIG. 2, the heating element 20 has a central area 32 and a peripheral edge 33 surrounding the central area 32.

The peripheral edge 33 has a closed contour.

The peripheral edge 33 completely surrounds the central area 32.

The heating device 19 includes first and second power supply members 35, 37 that are connected to the peripheral edge 33 of the heating element 20.

The first and second power supply members 35, 37 are typically electrodes. In a variant, they are assembled electrical contacts such as welded or any other suitable member.

The heating element 20 has a large upstream face 39 and a large downstream face 41 opposite each other (FIG. 1), and an edge 43 connecting the large faces 39, 41 to each other.

In the example shown, the first and second power supply members 35, 37 are attached to the edge 43.

In a variant, the first and/or second power supply members 35, 37 are attached to the large upstream face 39 or to the large downstream face 41 at the peripheral edge 33.

The peripheral edge 33 is divided into a first edge 45 and a second edge 47.

The first and second edges 45, 47 together cover the entire peripheral edge 33.

The first and second edges 45, 47 are bounded by, for example, the first and second power supply members 35, 37.

Thus, the first edge 45 corresponds to the portion of the peripheral edge 33 extending from the first power supply member 35 to the second power supply member 37 when following the peripheral edge 33 circumferentially clockwise in the embodiment of FIG. 2. The second edge 47 corresponds to the portion of the peripheral edge 33 extending from the first power supply member 35 to the second power supply member 37 when following the peripheral edge 33 circumferentially counterclockwise in the embodiment of FIG. 2.

Typically, the first and second power supply members 35, 37 are arranged symmetrically with respect to the geometric center C of the plate.

In the case where the heating element 20 is circular, the geometric center C of the plate corresponds to the center of the circle. In the case where the heating element 20 is elliptical, the geometric center C corresponds to the point located halfway between the two foci of the ellipse.

In general, the geometric center C corresponds to the isobar center of all the points of the plate.

The first and second edges 45, 47 are of the same length when the first and second power supply members are symmetrical with respect to the geometric center C of the heating element 20.

The power supply 21 is connected to the first and second power supply members 35, 37.

For example, the first power supply member 35 is connected to an electrical generator, and the second power supply member 37 is connected to ground.

In a variant, the first and second power supply members 35, 37 together form an angle of less than 180°, and preferably between 20° and 180°.

In a variant, the first and second edges 45, 47 are bounded by a straight line passing through the geometric center C of the heating element.

As seen in FIG. 2, the heating element 20 has a series of slots 49.1 through 49.8.

The slots 49.1 through 49.8 all extend substantially along a longitudinal direction L materialized by a dashed line in FIG. 2.

In other words, each of the slots 49.1 through 49.8 extends along a general longitudinal direction, which is the same for all slots.

The slots 49.1 through 49.8 define an S-shaped path through the heating element 20.

The slots 49.1 through 49.8 are offset from each other in a transverse direction and open alternately at the first edge 45 and at the second edge 47.

In other words, the slots 49.1 through 49.8 are spaced apart from each other along the transverse direction T, shown as a dashed line in FIG. 2.

Typically, they are substantially evenly spaced from each other along the transverse direction T.

The transverse direction T is perpendicular to the longitudinal direction L.

The heating element 20 extends substantially in a plane containing the longitudinal L and transverse T directions.

In the example shown, the heating element 20 includes eight slots. In a variant, the heating element 20 has fewer than eight slots or more than eight slots. The number of slots is dependent on the size of the heating element and the desired resistance.

The first slot 49.1, located at a first transverse end of the series of slots, opens at the first edge 45.

The second slot 49.2, which follows the first slot 49.1 in said series of slots, opens at the second edge 47.

As previously indicated, the slots open alternately at the first and second edges 45, 47, which means that each slot that opens at the first edge 45 is flanked by two slots that open at the second edge 47, and vice versa, except for the first and last slots.

Slots 49.1 through 49.8 are through slots. In other words, they extend through the entire thickness of the heating plate 20, from the large upstream face 39 to the large downstream face 41, and they open at the two large faces 39, 41.

The slots 49.1 through 49.8 delimit a series of longitudinal branches 51.1 through 51.9, in the heating element 20, connected to each other by elbows 53.1 through 53.8.

The branches 51.1 through 51.9 each extend in a general longitudinal direction. They are separated from each other by slots 49.1 through 49.8. The branches 51.1 through 51.9 are transversely offset from each other, like the slots 49.1 through 49.8.

The elbows 53.1 through 53.8 constitute cusps, and are thus U-shaped. Each elbow 53.1 through 53.8 connects two successive branches of the branch series.

Each branch 51.2 through 51.8 thus has a first longitudinal end connected by an elbow to the preceding branch in the series, and has a second longitudinal end opposite the first connected by another elbow to the following branch in the series of branches. The elbow and the other elbow are oriented in opposite directions.

The first electrical supply member 35 is connected to the first branch 51.1. The second power supply member 37 is connected to the last branch 51.9.

The slots 49.1 through 49.8 thus delimit a sinuous path for the electric current flowing between the two electric supply members 35, 37.

The first branch 51.1 is delimited between the first slot 49.1 and the peripheral edge 33. The last branch 51.9 is delimited between the last slit 49.8 and the peripheral edge 33.

The central area 32 is made of a first material that is electrically conductive and permeable to exhaust gases. The first material has a first relative density.

The elbows 53.1 through 53.8 are located in the peripheral edge 33. The elbows are made of a second material, electrically conductive and having a second relative density greater than the first relative density.

Advantageously, the elbows 53.1 through 53.8 are entirely made of the second material.

The first and second electrical supply members 35, 37 are connected to first and second sections 55, 57 of the peripheral edge 33 made of said second material.

The first and second sections 55, 57 are part of the first branch 51.1 and the last branch 51.9, respectively.

Typically, the peripheral edge 33 is entirely made of the second material.

Figure 4:
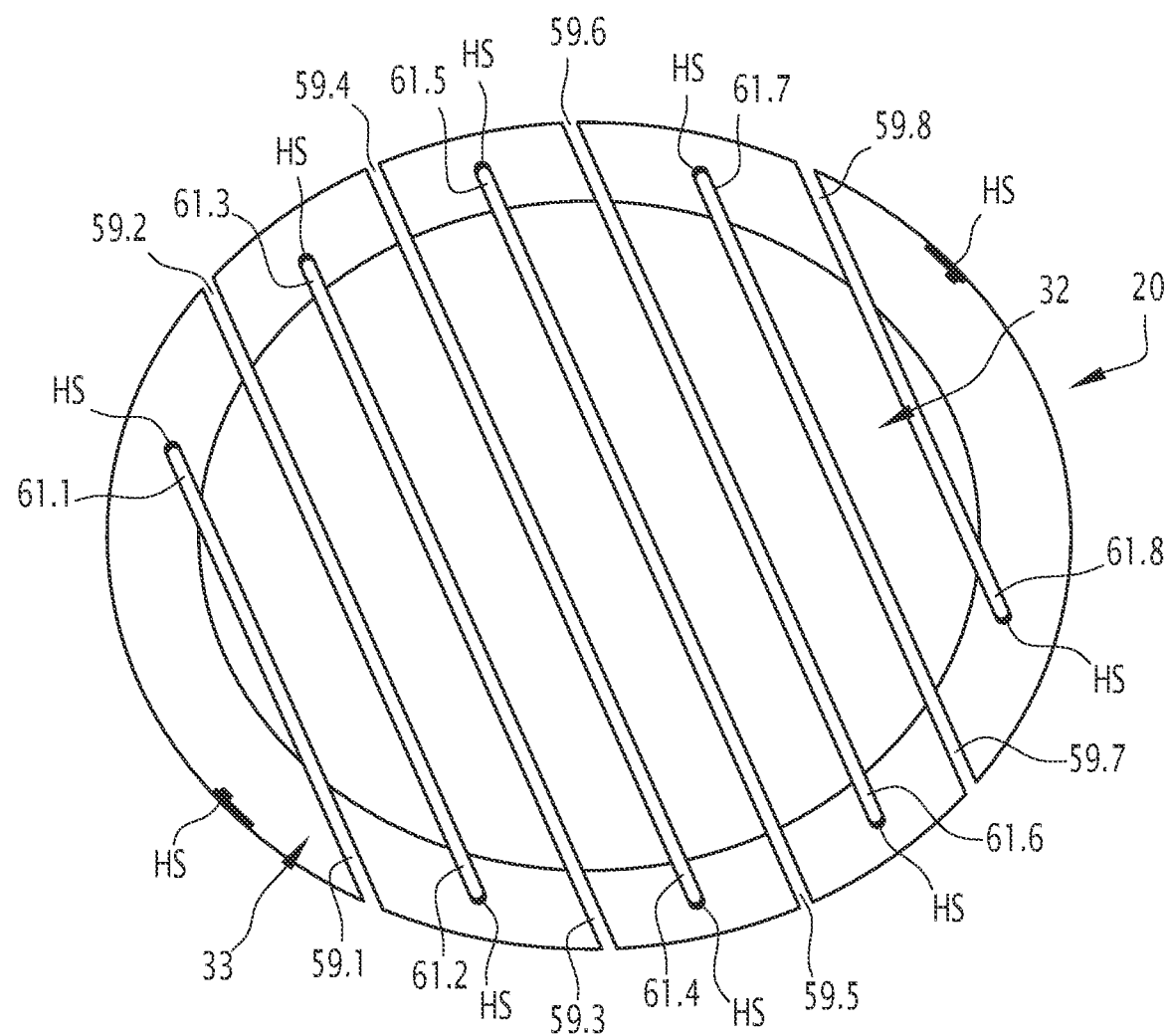
FIG. 4 is a front view of the plate in FIG. 2, showing the locations of the various hot spots, these hot spots being defined as the areas of the heating element where the current density is greater than 110 amperes per cm$^2$.

As seen in FIGS. 2 and 4, each slot 49.1 through 49.8 opens at the first edge 45 or at the second edge 47 through a proximal end 59.1 through 59.8, and has a closed distal end 61.1 through 61.8 located in the peripheral edge 33.

The first material is a foam of a metallic material, having a first volume concentration of pores.

The central region 32 thus comprises a network of passages for the exhaust gases, generating a turbulent flow of the exhaust gases through the heating element 20.

The metallic material constituting the central area 32 is stainless steel or another metallic alloy. For example, this material is an iron alloy, such as FeCrAl. In a variant, this material is a nickel or copper alloy, such as NiCr.

The foam has randomly or regularly organized open pores.

The pore volume concentration is typically between 5 ppi (pore per inch) and 50 ppi, preferably between 7 and 40 ppi, more preferably between 10 and 20 ppi.

The first material typically has a developed surface area between 500 and 5000 $m^2/m^3$, preferably between 1000 and 3000 $m^3/$, and even more preferably between 1300 and 2500 $m^2/m^3$.

The first material has a relative density of between 3 and 30%, preferably between 5 and 25% and even more preferably between 8 and 20%. By relative density is meant here the ratio between the density of the first material and the density of the metallic material constituting the first material, in the solid state, i.e., without pores.

Advantageously, the central area 32 is coated with at least one coating with a catalytic function to contribute to the post-treatment of the exhaust gas. This coating is provided for the oxidation and/or reduction of polluting compounds in the exhaust gas. It can be, for example, of the same type as those used in TWC (Three-way Catalyst), DOC (Diesel Oxidation Catalysis), PNA (Passive NOx Absorber), LNT (Lean NOx Trap), SCR (Selective Catalytic Reduction) or even for the hydrolysis of a reducing agent used for the reduction of nitrogen oxides.

In a variant or in addition, this coating is provided to increase the surface roughness of the material, in order to promote turbulence and thus heat exchange.

The second material comprises said metallic material and has a second relative pore density lower than the first density.

The second relative pore density is either zero or non-zero.

In the first case, the second material is solid. Its relative density is equal to 100%. It has no pores.

In the second case, the second material is advantageously a metallic foam.

The volume concentration of pores is then typically between 10 ppi (pore per inch) and 100 ppi, preferably between 15 and 80 ppi, even more preferably between 30 and 60 ppi.

The second material has a relative density of between 10 and 99%, preferably between 30 and 75% and even more preferably between 35 and 60%.

Advantageously, the second material comprises only said metallic material, plus optionally pores.

In a variant, the second material is a mixture or an alloy, comprising not only said metallic material but also another metallic material.

In a variant, the second material is different from the first material.

Advantageously, the central area 32 is made of this material. It is in one part, in the same material.

Typically, the central area 32 is obtained by cutting a one-part plate of the electrically conductive material.

In a variant, the central area 32 is obtained by casting, extrusion, sintering, additive manufacturing (3D printing), etc.

In other words, the central area 32 is in the form of a slice of electrically conductive material, cut directly to the desired shape.

The peripheral edge 33, along the central axis of the plate, has the same thickness as the central area 32. This thickness corresponds to the thickness of the plate defined above.

The peripheral edge 33 has a substantially constant width, in radial planes containing the central axis of the plate.

This width is between 2 and 30 mm, preferably between 2 and 20 mm, more preferably between 5 and 16 mm.

The central axis of the heating plate 20 is the axis passing through the center C of the heating plate 20 and perpendicular to the large faces 39, 41.

Typically, it is coincident with the central axis A.

The peripheral edge 33 has a shape substantially corresponding to the cross-sectional shape of the outer casing 15. Thus, if the outer casing 15 is circular in cross-section, the peripheral edge 33 will have an annular shape. An outer edge 63 and an inner edge 65 of the peripheral edge 33 will both be circular.

If the outer casing 15 has an elliptical cross section, the peripheral edge 33 will have a generally elliptical shape. The outer and inner edges 63, 65 of the peripheral edge 33 will also be elliptical.

The central area 32 has a shape that matches the inner edge 65 of the peripheral edge 33. An edge of the central area 32 is pressed against the inner edge 65 on all its periphery. The central area 32 is rigidly attached to said inner edge 65.

The electrical current density distribution in the heating element 20 has been simulated by calculation under conditions representative of a real exhaust line.

Five areas are shown in FIG. 2, referenced a through e, corresponding to increasing ranges of electrical current density. Area a corresponds to those portions of the heating element 20 in which the electrical current density is between 10 and 30 amps per $cm^2$. The areas b, c, d and e correspond respectively to the parts in which the electric current density is comprised between 30 and 50, 50 and 70, 70 and 90, 90 and 110 amps per $cm^2$.

As shown in FIG. 2, almost the entire heating element is located either in the area a or in the area b. Parts of very small areas are found in areas c and d, especially along the junction between the peripheral edge 33 and the central area 32.

Figure 5:
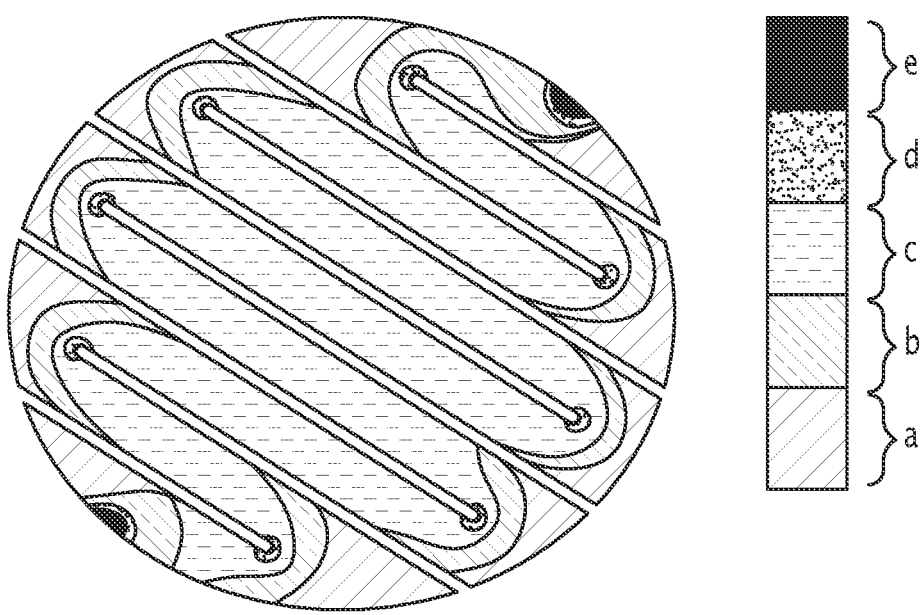
FIGS. 5 through 7 are similar views to FIGS. 2 through 4, for a comparative heating element in which the peripheral edge is made of the same material and of the same relative density as the central area.

FIG. 5 is a similar view to FIG. 2, for a heating element of the same geometry. The heating element in FIG. 5 differs from that in FIG. 2 only in that its peripheral edge is made of the same material and relative density as the central area.

The electric current density in this heating element was simulated by calculation, under the same conditions as for the heating element in FIG. 2. The areas a through e correspond to the same ranges of electric current density as for FIG. 2.

It is clear from FIG. 5 that the electric current density is less uniform than in the heating element in FIG. 2. In particular, a larger proportion of the heating element is in area b. There are two large hot spots at the first and second power supply members.

Figure 3:
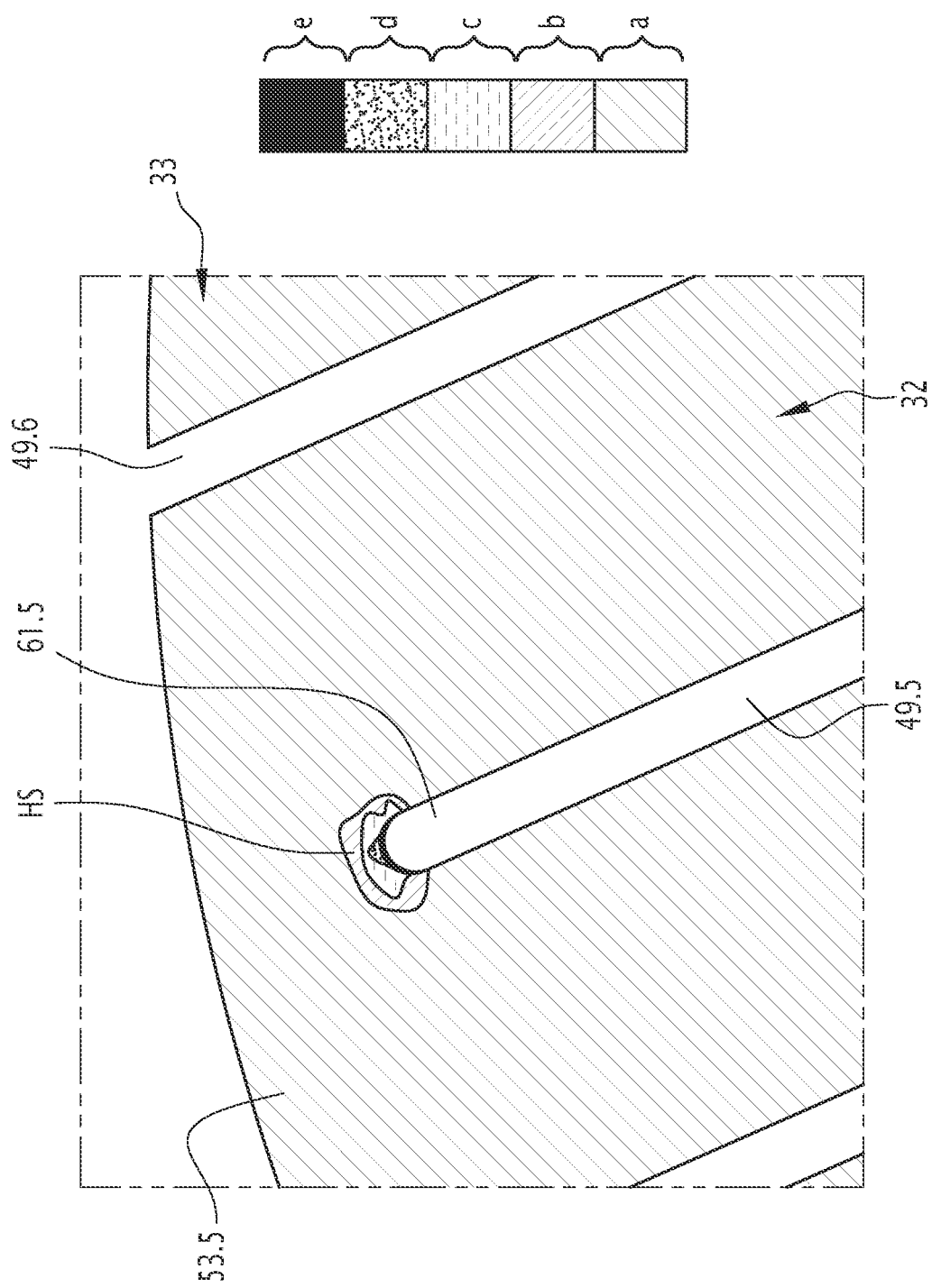
FIG. 3 is an enlarged view of a detail of FIG. 2, showing a hot spot located at the distal end of one of the slots.

FIG. 3 is an enlarged view of a detail from FIG. 2, showing a hot spot located at an elbow at the distal end of slot 49.5. The length of this hot spot is 1.76 mm. The length here is taken along the longitudinal direction.

Figure 6:
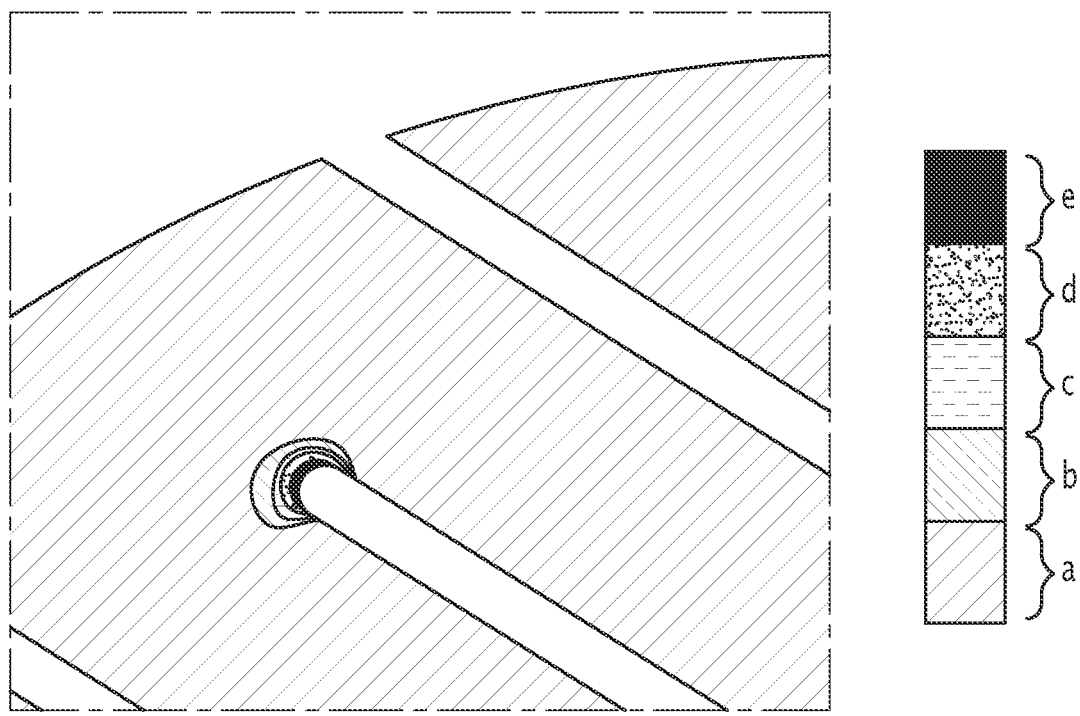

FIG. 6 is a similar view to FIG. 3, for the heating element in FIG. 5. FIG. 6 shows that the length of the hot spot is shorter than in FIG. 3. This length is about 1.36 mm, and is therefore decreased by 30% compared to FIG. 3. This highlights that the electric current is much more concentrated at the distal end of the slot in FIG. 6. As a result, the electric current density gradients and temperature gradients are much higher in FIG. 6 than in FIG. 3.

FIG. 4 is taken from FIG. 2. Only the hot spots HS have been materialized, by superposition on the heating element 20. These hot spots HS are defined as the parts of the heating element 20 where the electric current density is higher than 110 amps per $cm^2$. These hot spots HS are located at the distal ends 61.1 to 61.8 of the slots 49.1 through 49.8, and at the level of the electrical supply members 35, 37.

In total, these various hot spots HS correspond to a volume of approximately 135 $mm^3$ in the heating element 20.

Figure 7:
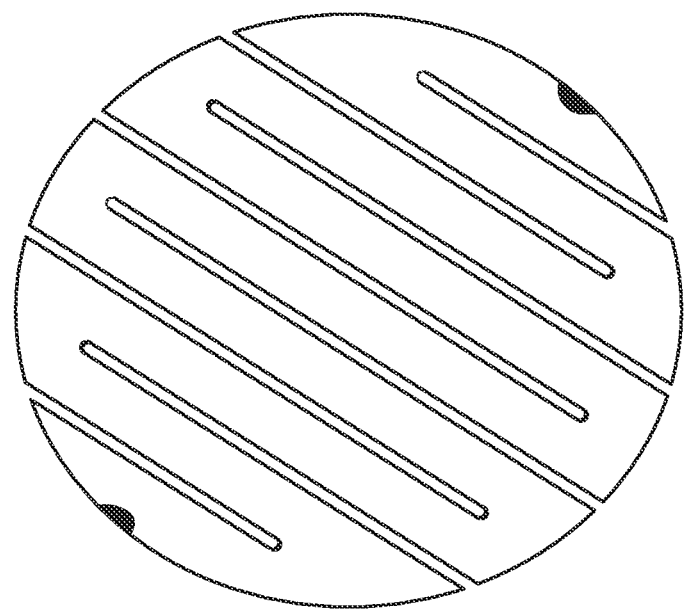

FIG. 7 is a view similar to that of FIG. 4, taken from FIG. 5.

It highlights two large volume hot spots, at the level of the first and second electrical supply members 35, 37. In total, the hot spots occupy a volume of 472 $mm^3$ in the plate of FIG. 5.

The manufacturing method of the heating device described above will now be detailed.

This manufacturing method comprises the following steps:
- obtaining an annular part made of the second material;
- obtaining a plate made of the first material;
- inserting the plate inside the annular part;
- solidifying the plate and the annular part by heating at a high temperature in an oven.

The annular part is intended to constitute the peripheral edge 33 of the heating element 20, and thus has substantially the same shape and dimensions as the peripheral edge 33 described above.

As described above, the annular part is circular or elliptical or any other suitable shape.

This annular part is obtained in any suitable manner For example, this annular part is a tube section made of the second material. This is particularly suitable when the second material is solid. The annular part is then obtained by cutting a section of the tube.

In a variant, the annular part is rolled and welded, or obtained by additive manufacturing, or by sintering.

The plate is intended to constitute the central area 32 of the heating element 20.

The plate is obtained in any suitable manner The plate is obtained in particular as described above.

During the bonding step, the plate inserted in the annular part is heated to a temperature suitable for joining the second material to the first material, so as to form a bond between the materials of the annular part and of the plate. This temperature is typically greater than 1000° C., preferably greater than 1200° C.

The manufacturing method further comprises a step of attaching the first power supply member 35 and the second power supply member 37 to the peripheral edge 33 of the heating element 20.

After the attachment step, the heating element 20 is obtained.

Another manufacturing method will now be described. This manufacturing method is specially adapted to a heating device in which the central part and the peripheral edge of the heating element are foams of a metallic material, of the type described above.

Figure 8:
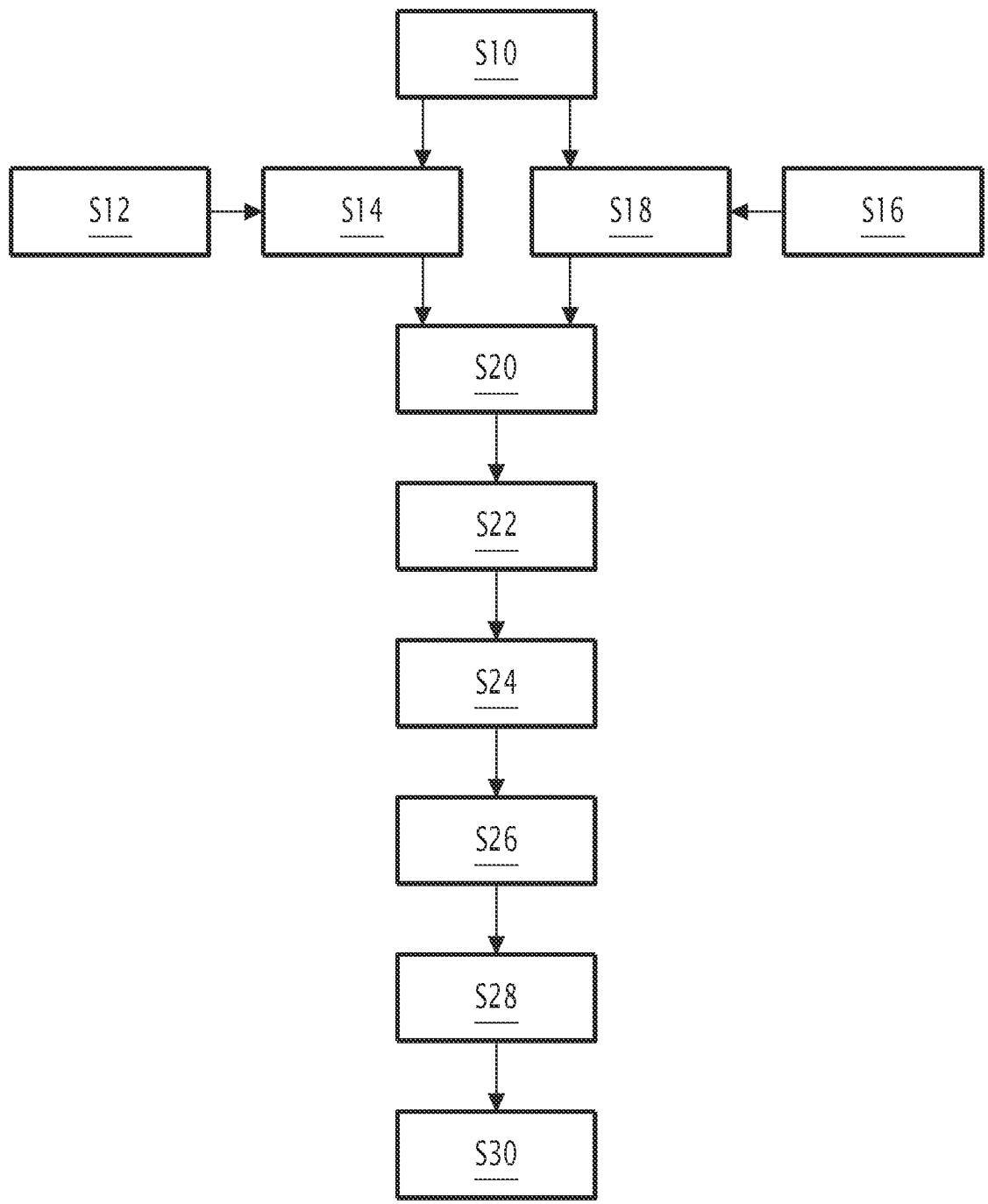
FIG. 8 is a step diagram of a method of manufacturing a heating device in which the first and second materials are metallic foams.
Figure 9:
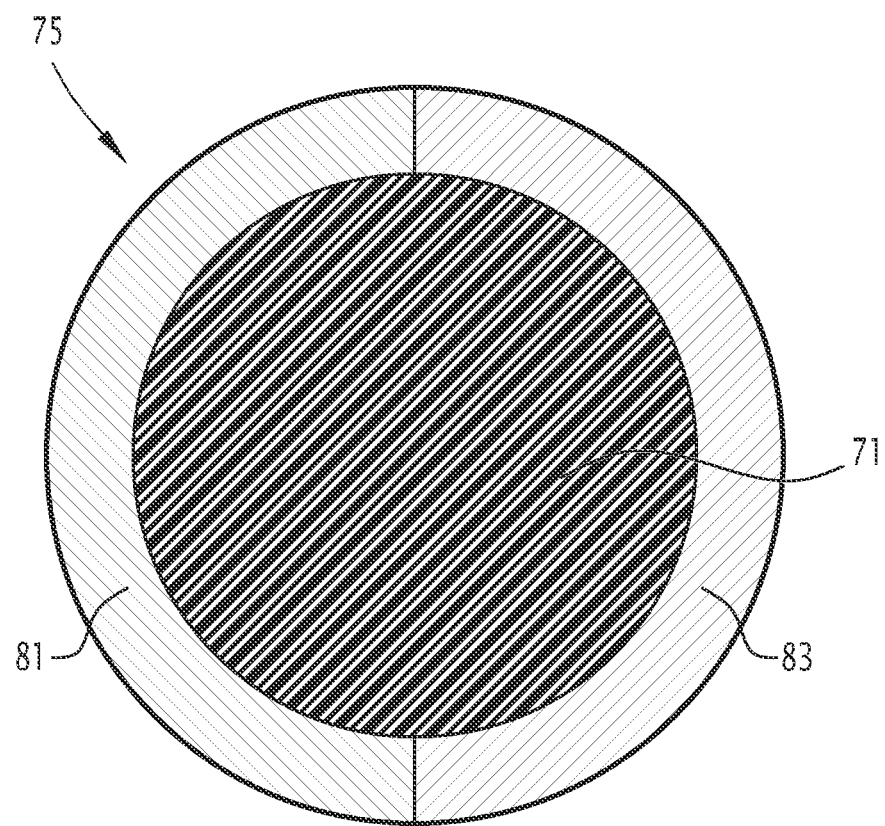
FIGS. 9 and 10 are a top view and a sectional view, respectively, of a mold used for the high temperature heating step of the method of FIG. 8.
Figure 10:
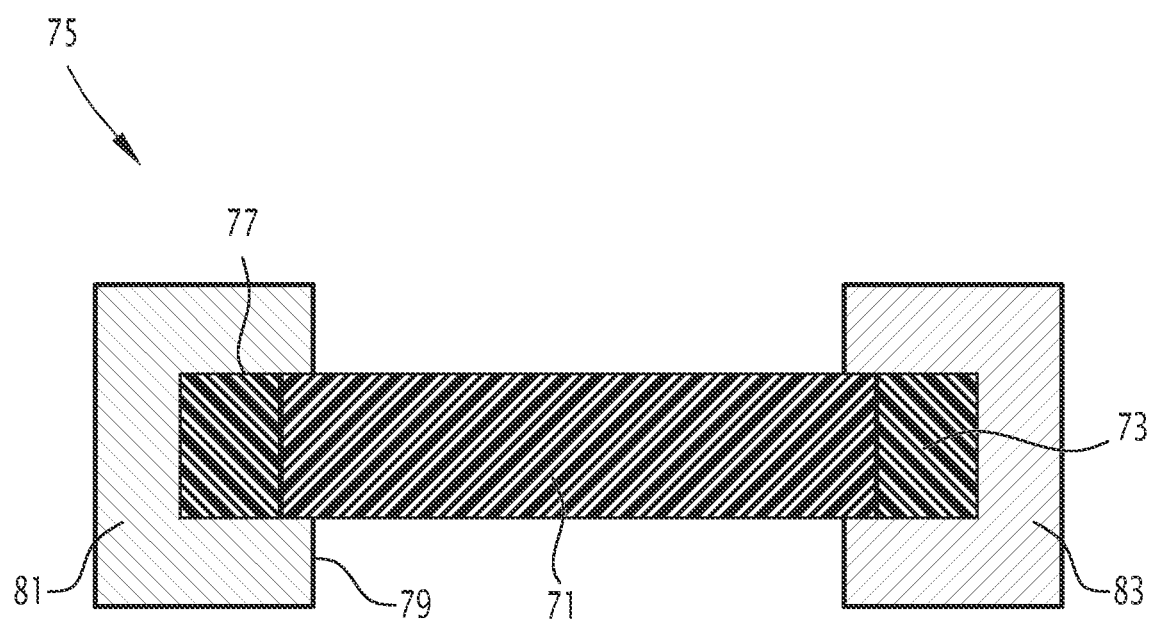

As illustrated in FIG. 8, the manufacturing method comprises the following steps:
- S10: obtaining a liquid suspension comprising a powder of said metallic material and a binder;
- S12: obtaining a plate 71 made of a first plastic foam;
- S14: impregnation of said plate 71 with the liquid suspension;
- S16: obtaining an annular part 73 in a second plastic foam;
- S18: impregnation of the annular part 73 with the liquid suspension;
- S22: insertion of the plate 71 inside the annular part 73;
- S26: securing of the plate 71 and of the annular part 73 by heating at a high temperature in an oven.

The metallic material is of the type described above. For example, it is an iron alloy such as FeCrAl.

The binder comprises, for example, a poly (vinylalcohol), of the type sold under the trade name Moviol 10-98. Advantageously, the binder also comprises a polyethylene glyco, for example of the type sold under the trade name PEG 400.

The function of the binder is to make the suspension tacky, so that better impregnation of the plastic foam is obtained.

The metallic powder and the binder are suspended in deionized water.

The plate 71 obtained in step S12 is intended to form the central area 32 of the heating element 20.

The plate has substantially the shape and dimensions of the central area 32 of the heating element in the finished state.

This plate is typically cut from a block of the first foam.

The first foam is advantageously an open cell polyurethane foam.

The cells of the polyurethane foam are typically of dimensions between 1 and 5 mm.

This dimension corresponds to the largest width of the cell.

The first foam has a volume concentration of pores chosen so that the central area 32 of the heating plate has, at the end of the process, the first relative density indicated above.

This pore volume concentration is determined experimentally.

In step S14, the impregnation of the plate is carried out, for example, by immersing the foam plate in the liquid suspension.

The annular part obtained in step S16 is intended to form the peripheral edge 33 of the heating element 20. It has substantially the shape and the final dimensions of said peripheral edge 33 in the finished state.

The annular part 73 is obtained for example by cutting a block of the second foam to the dimensions of the annular part 73.

The second foam is advantageously an open cell polyurethane foam.

The second foam has pores between 0.1 mm and 5 mm in size, preferably 0.25 mm to 2 mm. The term "pore size" is understood here to mean the greatest width of the pores.

The second foam has a pore volume concentration chosen so that the peripheral edge 33 of the heating plate has, at the end of the process, the second relative density indicated above.

This pore volume concentration is determined experimentally.

The annular part 73, in step S18, is impregnated for example by immersing the annular part 73 in the liquid suspension.

Before the insertion step S22, the plate 71 and the annular piece 73 undergo an excess liquid removal step S20.

This excess liquid removal step S20 is intended to remove the excess liquid suspension impregnating the plate 71 and the annular part 73. The excess liquid removal step S20 makes it possible, among other things, to eliminate the liquid suspension filling the pores of the plastic material foam.

After the excess liquid removal step, only a layer of liquid suspension remains covering the solid membranes of the plastic foam, most of the cells of the plastic foam being free, that is to say unfilled. by the liquid suspension.

The excess liquid removal step S20 is carried out by passing the plate 71 and the annular part 73 between two rollers. The spacing between the two rollers is adjusted so as to strongly compress the plate 71 and the annular part 73.

In other words, the annular piece 73 and the plate 71 are wrung out as one would with a sponge.

If necessary, excess liquid removal using the rollers is supplemented by spinning in a centrifuge. This helps to improve the homogeneity.

Advantageously, in the insertion step S24, the plate 71 and the annular part 73 are placed in a mold 75, as illustrated in FIGS. 9 to 12.

The mold 75 is a crown mold, comprising a groove 77 hollowed out in the radially internal face of the crown.

In other words, the mold 75 has a radially internal face 79, with a closed contour, the groove 77 being hollowed out in the radially internal face 79.

The annular piece 73 is placed at the bottom of the groove 77. It is entirely housed inside the groove 77.

The plate 71 is arranged such that its peripheral edge is engaged in the groove 77.

Thus, the plate 71 and the annular part 73 are arranged inside the mold 75 with the plate 71 inserted into the annular part 73. The plate 71 is held in position inside the annular part 73 by the mold 75.

In order to facilitate the insertion of the plate 71 and the annular piece 73 inside the groove 77, the mold 75 is divided into two half-rings 81, 83.

Each half-ring 81, 83 extends over half of the circumference of the crown mold 75. Each half-ring 81, 83 circumferentially defines half of the groove 77.

The half-rings 81, 83 are rigidly and removably attached to one another in a mechanical manner of any suitable type.

Figure 11:
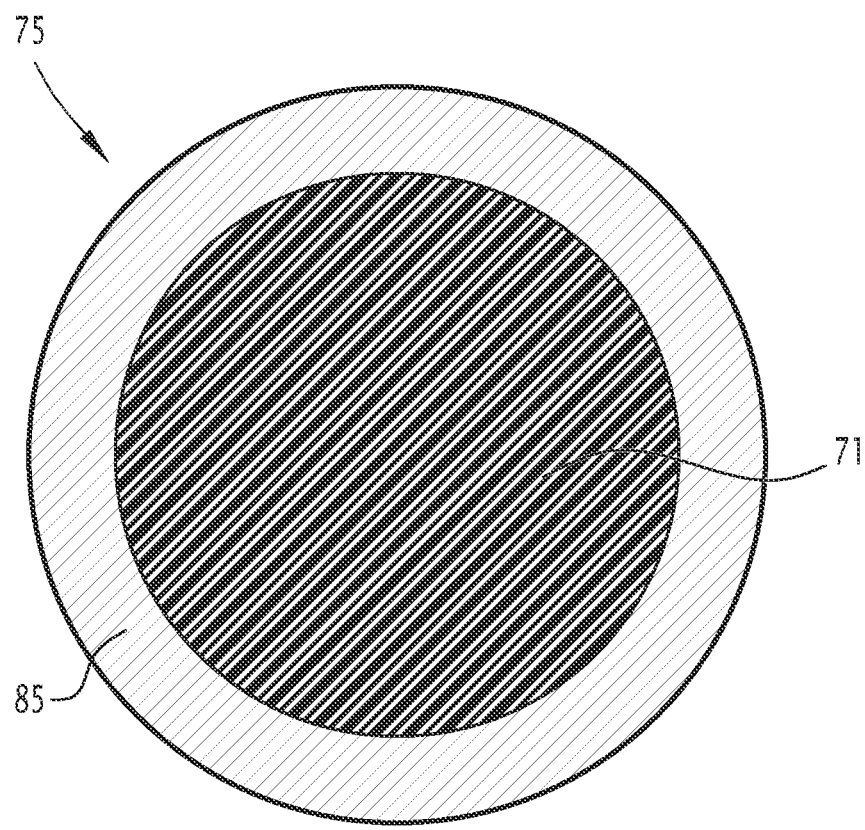
FIGS. 11 and 12 are views similar to those of FIGS. 9 and 10, showing another example of a mold usable in the method of FIG. 8.
Figure 12:
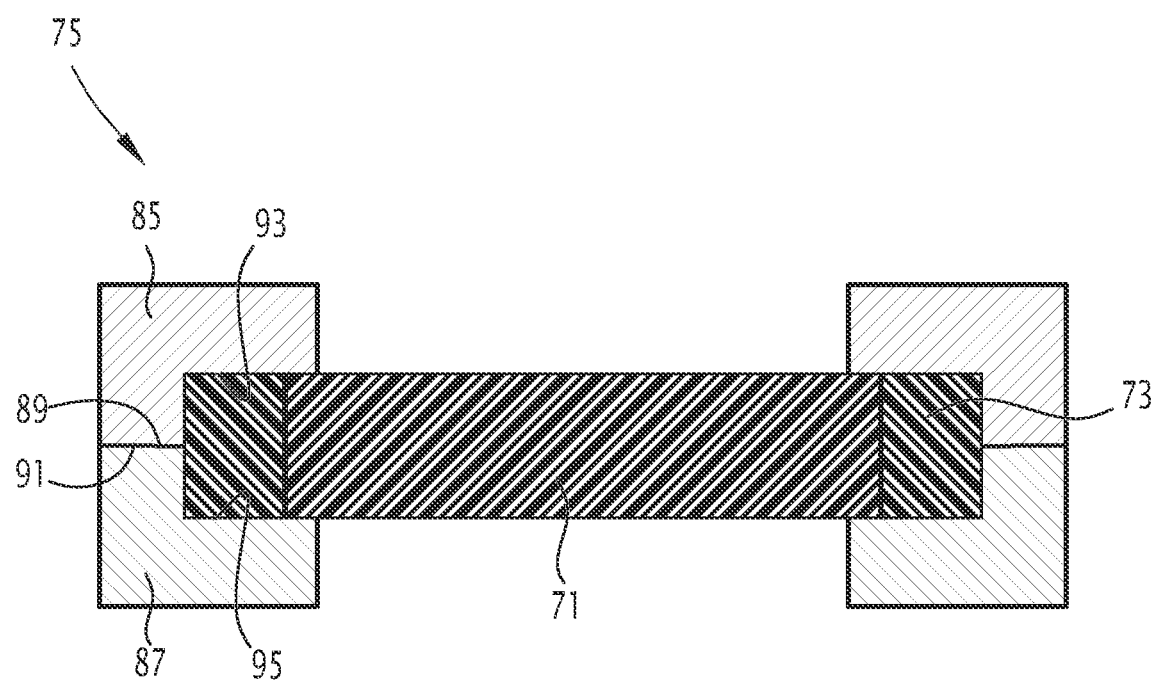

According to an alternative embodiment illustrated in FIGS. 11 and 12, the crown mold 75 is divided into an upper crown 85 and a lower crown 87. The upper and lower crowns 85, 87 have a closed contour. They are superimposed on top of each other. They are pressed against each other via respective annular faces 89, 91.

Grooves 93, 95 are hollowed out in the annular faces 89, 91. These grooves have a closed contour and are open radially towards the interior of the upper and lower molds 85, 87. The grooves 93, 95, together, define the groove 77.

The lower and upper molds 85, 87 are removably attached to each other in a mechanical manner of any suitable type.

Between the insertion step S22 and the securing step S26, the method advantageously comprises a step S24 of drying the plate 71 and the annular part 73.

This step also removes the binder, which is vaporized by heating.

The drying step S24 is carried out by heating the plate 71 and the annular part 73, to temperatures between 250° C. and 800° C.

Advantageously, the drying step S24 comprises a first sub-step, during which the plate 71 and the annular part 73 are maintained at about 250° C. for about thirty minutes.

The first sub-step is followed by a second sub-step, during which the plate 71 and the annular part 73 are maintained at a temperature between 400 and 500° C., for a period of approximately 90 minutes. The temperature to which the plate 71 and the annular part 73 are heated is a function of the volume concentration of pores in the first and second foams.

The second sub-step is advantageously followed by a third sub-step, during which the plate 71 and the annular part 73 are maintained at a temperature between 500 and 800° C., depending on the volume concentration of pores, for a period of approximately 90 minutes.

The drying step S24 is carried out with the plate 71 and the annular part 73 held in the mold 75.

The drying is carried out, for example, by placing the mold 75 on a conveyor, and by moving the mold 75 through an oven, with the plate 71 and the annular part 73.

The securing step S26 is performed by placing the plate 71 and the annular part 73 in a high temperature oven.

The plate 71 and the annular part 73 are held in the mold 75 during the securing step S26. The oven is maintained under vacuum, or under an atmosphere of hydrogen.

The securing step S26 comprises a first sub-step, during which the plate 71 and the annular part 73 are maintained at 650° C. for about 60 minutes.

It then comprises a second sub-step, during which the plate 71 and the annular part 73 are maintained at a temperature of about 1200° C. for about 60 minutes.

It advantageously comprises a third sub-step, during which the plate 71 and the annular part 73 are maintained at a temperature of between 1250° C. and 1350° C., for approximately 60 minutes.

The securing step makes it possible to secure the plate 71 to the annular plate 73. The outer peripheral edge of the plate 71 becomes rigidly fixed to the radially inner edge of the annular part 73.

The securing step allows sintering of the plate 71 and of the annular part 73.

During the securing step, the polyurethane foam is vaporized.

It should be noted that the presence of the mold 75 is particularly advantageous for obtaining the attachment of the plate 71 and the annular part 73, due to the fact that the mold 75 maintains in position the respective surfaces of the two parts in contact with one another.

At the end of the securing step, the mold 75 is removed.

The method also comprises a step S28, during which the slits 49.1 to 49.8 are cut, advantageously by laser cutting.

Step S28 is followed by step S30, during which the power supply members 35, 37 are rigidly fixed on the peripheral edge 33. The final inspection of the heating element is also carried out during step S30.

The heating device described above has multiple advantages.

As described above, the electrical current density is more uniform at the elbows. The electrical current density gradients at the elbows are reduced, and the temperature gradients are also reduced.

Because the first and second power supplies are also connected to sections of the second material, which has a higher relative density, the power density gradients at the power supplies are also reduced. The temperature gradients are also reduced accordingly. In addition, the volume of hot spots at the first and second power supplies is significantly reduced.

The fact that the peripheral edge is made entirely of the second material allows for easy fabrication of the heating element. It is possible to use an annular part such as a section of tube to obtain the peripheral edge.

In this case, the central area of the heating element can be easily joined to the peripheral edge by placing a plate of the first material inside the annular part and heating the assembly in a high-temperature oven.

This also makes it easier to attach the first and second power supply members to the peripheral edge 33, due to the fact that these members are attached to sections of higher relative density.

The fact that the peripheral edge is made entirely of the second, higher relative density material also reduces abrasion to which the retaining mat pressed against the outer surface of the heating element is exposed.

Because the distal end of each slot is located in the peripheral edge, all of the material surrounding this distal end is the second, higher relative density material. The hot spots at the elbows are essentially located around this distal end, so this arrangement of the distal ends contributes significantly to reducing hot spots at the elbows.

The disclosure may have multiple variants.

In one non-preferred variant, the peripheral edge is not entirely made of the second material. For example, only the elbows are made of the second material, and not the first leg and the last leg.

In a variant, the elbows are partially made of the second material. For example, the portion of the elbows 53.1 through 53.8 surrounding the distal end 61.1 through 61.8 of each slot is of the second material, and the portion of the elbows 53.1 through 53.8 located away from the distal end 61.1 through 61.8 of each slot is of another material.

In a variant, the central portion 32 of the heating element 20 is of a non-metallic material, such as a ceramic. For example, this material is a silicon carbide SiC ceramic.

In a variant, the central portion 32 of the heating element 20 is not a foam, but is of a honeycomb material.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A heating device for an exhaust gas purification member, the heating device comprising:
   a heating element having a central area and a peripheral edge surrounding the central area;
   the heating element having a series of slots, the series of slots defining an S-shaped path through the heating element;
   the series of slots delimiting a series of longitudinal branches in the heating element, connected to each other by elbows and transversely offset from each other;
   the central area being made of a first electrically conductive material, permeable to exhaust gases and having a first relative density;
   the elbows being located in the peripheral edge, the elbows being made of a second electrically conductive material and having a second relative density greater than the first relative density, wherein relative density is defined as a ratio between a density of a specified material and a density of a metallic material constituting the specified material in a solid state without pores.

2. The heating device according to claim 1, wherein first and second electrical supply members are connected to first and second sections of the peripheral edge made of the second electrically conductive material.

3. The heating device according to claim 1, wherein the peripheral edge is entirely made of the second electrically conductive material.

4. The heating device according to claims 1, wherein the elbows are entirely made of the second electrically conductive material.

5. The heating device according to claim 1, wherein the peripheral edge is divided into a first edge and a second edge, each slot opening at the first edge or at the second edge through a proximal end and having a closed distal end located in the peripheral edge.

6. The heating device according to claim 1, wherein the first electrically conductive material is a foam of a metallic material, having a first pore volume concentration.

7. The heating device of claim 6, wherein the second electrically conductive material comprises the metallic material and has a second pore volume concentration less than the first pore volume concentration.

8. An exhaust gas purification device, comprising:
   an outer casing;
   an exhaust gas purification member placed in the outer casing;
   the heating device according to claim 1, the heating element being arranged in the outer casing.

9. An exhaust line comprising the exhaust gas purification device according to claim 8.

10. A method for manufacturing the heating device according to claim 1, the manufacturing method comprising the following steps:
    obtaining an annular part made of the second electrically conductive material;
    obtaining a plate made of the first electrically conductive material; and
    inserting the plate inside the annular part; and
    bonding the plate and the annular part by heating at a high temperature in an oven.

11. The heating device according to claim 1, wherein an area of a respective elbow delimits a distal end of each slot and is comprised of the second electrically conductive material having the second relative density.

12. The heating device according to claim 1, wherein an edge of a distal end of each slot is comprised of the second electrically conductive material having the second relative density.

13. The heating device according to claim 1, wherein a distal end of each slot is cut in a zone made of the second electrically conductive material having the second relative density.

14. The heating device according to claim 1, wherein the first electrically conductive material has a first void ratio, the second electrically conductive material has a second void ratio lower than the first void ratio, and wherein the void ratio is, for a given section of material, a ratio between a cumulative or total surface area of voids in the given section over a surface area of the given section.

15. A method for manufacturing the heating device according to claim 7, the method comprising the following steps:
    S10: obtaining a liquid suspension comprising a powder of the metallic material and a binder;
    S12: obtaining a plate made of a first plastic foam;
    S14: impregnation of the plate with the liquid suspension;
    S16: obtaining an annular part in a second plastic foam;
    S18: impregnation of the annular part with the liquid suspension;
    S22: insertion of the plate inside the annular part; and
    S26: securing of the plate and of the annular part by heating at a high temperature in an oven.

16. The method according to claim 15, wherein during the insertion step S22, the plate and the annular part are placed in a mold, the securing step S26 being carried out with the plate and the annular part placed in the mold.

17. The method according to claim 15, including a step S24 of drying the plate and the annular part, before the securing step S26.

* * * * *